(12) United States Patent
Liang et al.

(10) Patent No.: US 10,110,418 B2
(45) Date of Patent: Oct. 23, 2018

(54) CLOUD COMPUTING SERVICE ARCHITECTURE

(71) Applicant: Rancher Labs, Inc., Mountain View, CA (US)

(72) Inventors: Sheng Liang, Los Altos Hills, CA (US); Darren Shepherd, Gilbert, AZ (US)

(73) Assignee: Rancher Labs, Inc., Mountain View, CA (US)

( * ) Notice: Subject to any disclaimer, the term of this patent is extended or adjusted under 35 U.S.C. 154(b) by 214 days.

(21) Appl. No.: 14/931,678

(22) Filed: Nov. 3, 2015

(65) Prior Publication Data

US 2017/0126469 A1 May 4, 2017

(51) Int. Cl.
*G06F 15/16* (2006.01)
*H04L 12/24* (2006.01)
*H04L 29/08* (2006.01)

(52) U.S. Cl.
CPC ............ *H04L 41/04* (2013.01); *H04L 41/042* (2013.01); *H04L 41/5096* (2013.01); *H04L 67/1002* (2013.01); *H04L 67/1076* (2013.01); *H04L 67/1097* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 8,977,735 B2 * | 3/2015 | Salinas | ............. | G06F 17/30557 370/217 |
| 9,495,142 B2 * | 11/2016 | Koushik | ................... | G06F 8/61 |
| 9,576,155 B2 * | 2/2017 | Potlapally | ............... | G06F 21/64 |
| 9,633,054 B2 * | 4/2017 | Salinas | ............. | G06F 17/30557 |
| 9,722,948 B2 * | 8/2017 | Antony | ................. | H04L 47/722 |
| 9,747,249 B2 * | 8/2017 | Cherian | ................. | H04L 45/74 |
| 2015/0195137 A1 * | 7/2015 | Kashyap | ............. | H04L 41/0893 370/254 |
| 2015/0381411 A1 * | 12/2015 | Keagy | ....................... | G06F 8/61 709/220 |
| 2016/0112497 A1 * | 4/2016 | Koushik | ................. | H04L 67/10 726/7 |
| 2016/0132805 A1 * | 5/2016 | Delacourt | ........ | G06Q 10/06313 705/7.23 |
| 2016/0132806 A1 * | 5/2016 | To | ..................... | G06Q 10/06313 705/7.23 |
| 2016/0132808 A1 * | 5/2016 | To | .................... | G06Q 10/06315 705/7.25 |

(Continued)

*Primary Examiner* — Alicia Baturay
(74) *Attorney, Agent, or Firm* — Fenwick & West LLP

(57) ABSTRACT

A service control system manages a set of containers operating within one or more computing hosts. Containers may access a consistent runtime environment regardless which cloud provider the computing hosts come from. Each computing host also runs a control plane agent that interacts with the service control system to provide a set of services to the containers on the computing host and connect the containers to an overlay network of the service control system. The service control system thus may provide networking, firewall, storage, and load balancing services to the various containers. This permits a set of heterogeneous computing hosts to provide consistent services regardless of the underlying computing resources and containers that are managed by the service control system.

17 Claims, 6 Drawing Sheets

(56) References Cited

U.S. PATENT DOCUMENTS

| | | | |
|---|---|---|---|
| 2016/0134616 A1* | 5/2016 | Koushik | H04L 63/0807 726/9 |
| 2016/0149751 A1* | 5/2016 | Pani | H04L 41/0668 370/221 |
| 2016/0323377 A1* | 11/2016 | Einkauf | H04L 67/1076 |
| 2016/0330138 A1* | 11/2016 | Thomason | H04L 67/10 |
| 2017/0070561 A1* | 3/2017 | Li | H04L 67/10 |

* cited by examiner

CLOUD COMPUTING SERVICE ARCHITECTURE

BACKGROUND

This invention relates generally to managing networking, storage, and other services for computing hosts and particularly to managing services across one or more cloud computing providers.

In cloud computing architectures, computing hosts are provided for a subscriber by various cloud computing providers. A cloud computing provider operates a large assembly of physical computer systems, each with processor, memory, storage, and networking capabilities. The capabilities (equivalently, services) of these physical computer systems are made available via virtualized host computers (aka Virtual Machines, or VMs), each with virtual processor, memory, storage, networking capabilities. A subscriber obtains access to some portion of overall services via some number of provisioned hosts. For example, a cloud computing provider may provide one or more computing hosts executing a Linux operating system for use by a subscriber.

Commonly, a subscriber uses multiple cloud computing providers concurrently, to obtain different types and levels of services. Each cloud computing provider may provide discrete services for managing the hosts on each of these cloud computing providers, but because each cloud computer provider operates differently, it may be difficult for the subscriber to effectively utilize these services across more than one cloud computing provider interchangeably and may overly rely on tools or other techniques particular to that cloud computing provider. This may prevent effective use of more than one cloud computing provider by a subscriber, and limit a subscriber to the tools and systems made available by the particular cloud computing provider. That is, each cloud computing provider may provide discrete services which cannot be effectively leveraged by with systems operated at other providers. Subscribers cannot utilize cloud providers as a computing utility that offers commoditized services that can be obtained from a variety of providers.

SUMMARY

A service control system manages computing services for a set of containers in various computing hosts using a control plane. A container provides a standardized runtime environment for applications executing in the container, and provides the application code, system tools, system libraries, and other functions running in each container's logically separate access to CPU, memory, storage, networking, and other resources. The computing hosts may be separated among one or more cloud computing providers such that the variety of different computing hosts may be controlled via the service control system despite being located at different cloud computing providers.

The computing hosts of a client include computer hosts at a cloud computing provider, as well as computing hosts operated by the client that are not a part of a cloud computing architecture, such as a private server of the client. A computing host may be a physical server or a virtual machine. These computing hosts may operate containers. A computing host provides a storage volume and a networking address (e.g., an IP address). The computing host includes a control plane agent to enable containers at the computing host to be managed by the service control system. When containers are created at the computing host, the control plane agent provides an overlay network to the container to provide a network on which containers may communicate with one another and be managed by the service control system. The service control system may manage additional services, such as load balancing and storage backup via the control plane agent on the computing host.

This services architecture provides a control plane for each computing host, and permits the service control system to manage containers and computing hosts with varying heterogeneous configurations (e.g., different types of physical machines and virtual machines) across multiple cloud providers. This service control may be used for the various computing hosts without relying on specific APIs or provider-based services, and permits rich services for managing the computing hosts. The control plane may provide control of the computing hosts from beyond a cloud provider's network and may control computing hosts at several cloud providers. The control plane may use the basic computing resources of a computing host, without relying on additional services of the cloud provider's network.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
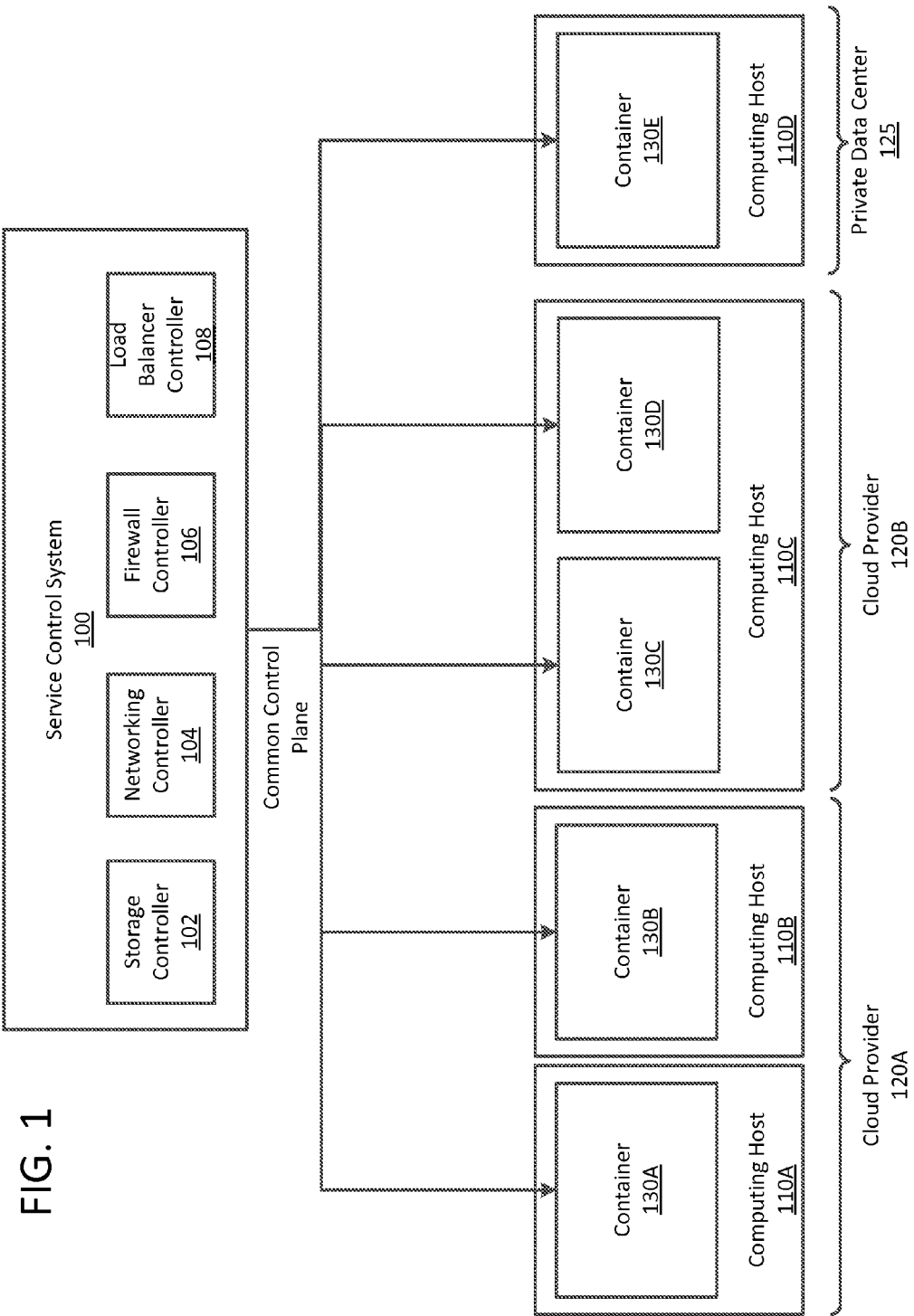
FIG. 1 shows an example environment for controlling services of application containers that may be distributed at several computing hosts.

FIG. 1 shows an example computing environment for controlling application containers that may be distributed at several computing hosts. A service control system 100 provides various services, such as storage, networking, firewall, and load balancing, for a plurality of containers 130A-E (generally container 130) at the various computing hosts 110A-D (generally computing host 110). The service control system 100 provides a common control plane for organizing these services across the various containers. The control plane implements the management and control functions to ensure the proper functioning of a particular service. A network control plane, for example, ensures that cross-host networking is setup correctly so that containers running on multiple computing hosts may communicate with each other.

A container is a standardized application package format for the code required to form an application. A container includes application code, system tools, system libraries, and other functions required to run the application. A container provides a standardized runtime environment for running applications on computing hosts. A container provides a standardized runtime environment by logically separating the container from other containers operating on the same computing host, and by providing each container with its own logically separate CPU, memory, storage, and networking resources. Each container on a computing host may share a kernel with other containers on a computing host, but operate in a distinct userspace and be generally independent from functions of other containers operating in the computing host, and maintain a 'private' and 'isolated' view of the operating system. The runtime environment for containers may reside on many computing hosts 110 provisioned by different cloud providers 120, permitting a given application to be consistently and reliably executed on many different computing hosts 110 and managed by the service control system 100, so long as each computing host offer the ability to host the standardized the runtime environment for containers. Each container 130 may individually execute applications and processes, and may have a separate file system allocated by the computing host. One example container format and container runtime on the Linux operating system is Docker.

As further described below, each computing host 110 provides logical computing resources in which a container 130 operates, such as CPU, memory, storage, and networking A computing host may be a physical server system, or may be a virtual machine. In general, multiple cloud providers 120 may provide computing hosts 110. For example, a given cloud computing provider may provide one or more computing hosts for use by a client. In the example shown by FIG. 1, cloud provider 120A provides two computing hosts 110A, 110B each including containers 130A and 130B respectively. Cloud provider 120B provides one computing host 110C in this example, which includes two containers 130C and 130D. In addition, a private data center 125 may provide physical or virtual machines separate from each cloud provider 120A and 120B. The private data center 125 represents a specific machine, such as a server stored at the client's facility.

The service control system 100 provides services to the containers 130 at these various providers via various components of the service control system 100, including a storage controller, networking controller, firewall controller, and load balancer controller. The functions of these controllers are further described below. The service control system 100 communicates with the various containers 130 via a network.

In operation, each computing host 110 is accessible via a networking address on the network, which may be unique to each computing host 110. Each container is assigned a unique networking address on an overlay network maintained by the service control system 100, permitting each container 130 to be individually addressable via the overlay network, even when separately located at another computing host 110 or in a separate cloud provider 120. For example, container 130A on computing host 110A may direct a message via the overlay network to container 130D on computing host 110C at the overlay network address of container 130D. The computing host 110 may also include some local storage at the computing machine 110, a portion of which may be used by each container 130 as a volume accessible to the container 130 for storing and maintaining data related to execution of applications within the container 130. Maintenance of these networking and storage systems are further described below.

Figure 2:
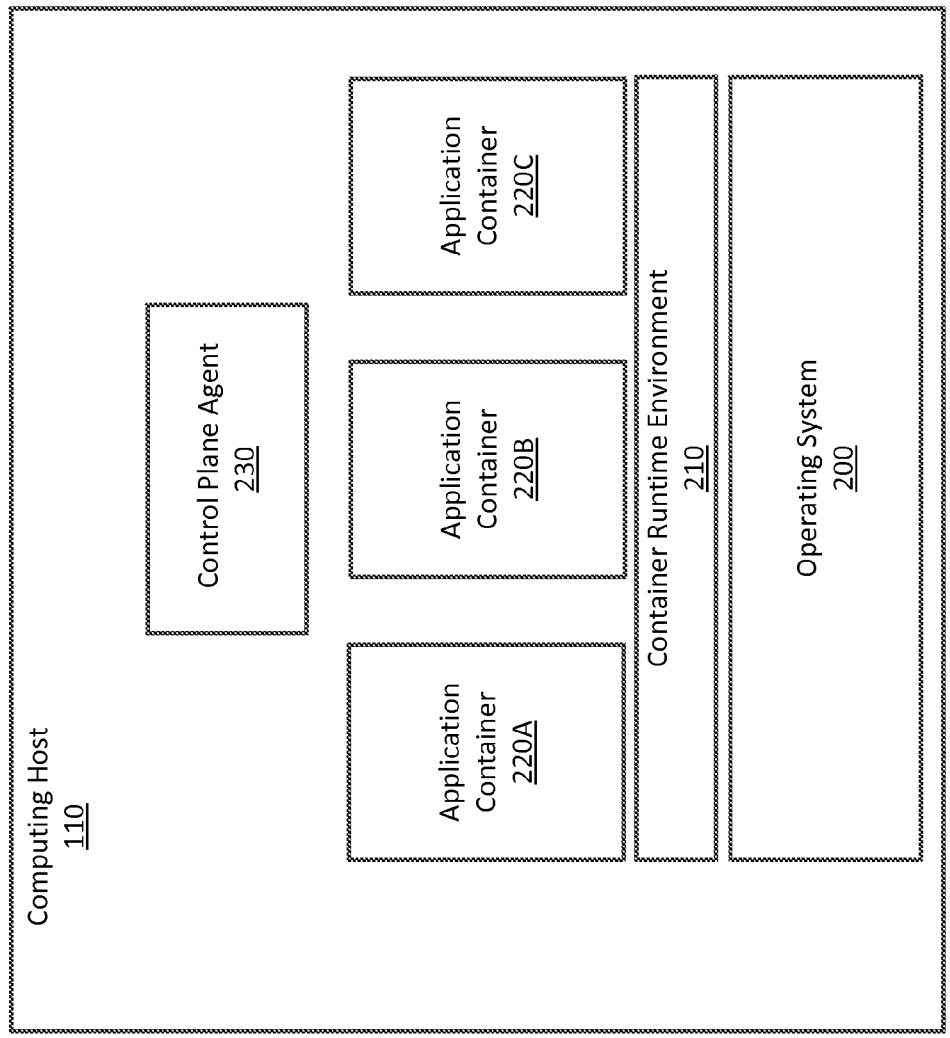
FIG. 2 illustrates the components of a computing host 110 according to one embodiment.

FIG. 2 illustrates the components of a computing host 110 according to one embodiment. In this example, the computing host 110 includes an operating system 200, a container runtime environment 210, one or more application containers 220, and a control plane agent 230. The modules are not native components of the underlying computer system, and provide features and functionality that extend beyond the generic functions of the underlying computer system.

The computing host 110 provides a CPU, memory, storage, networking, and other computing resources, not shown here, for operation by the various processes operating in the computing host 110. To operate these computing resources, the computing host 110 executes an operating system 200. The operating system may manage transmitting messages from the computing host 110 to other systems over the network, control access to the processor from various processes and applications, and so forth. An example of such an operating system is LINUX.

The container runtime environment 210 manages a set of application containers 220 that access computing resources of the computing host 110. As shown, three separate application containers 220A-C are instantiated and managed by the container runtime environment 210. The container runtime environment 210 creates and destroys the containers in the set of containers. The application containers 220 access the operating system 200, and the container runtime environment 210 provides the logical separation of the requests by the application containers 220. When an application container 220 requests access to services and resources managed by the operating system 200, the container runtime environment 210 may receive these requests and translate the requests if necessary prior to transmitting the request to the operating system 200. In another example, the container runtime environment 210 may monitor such accesses, but an application container 220 may directly access the operating system 200 itself. The container runtime environment 210 thus provides a consistent set of operating system libraries and binary executable files for an application accessible within the application container 220. One example container runtime environment 210 is DOCKER in the LINUX operating system, though other container runtime environments may also be used that provide similar compartmentalization of application operating environments.

Each application container 220 executes one or more applications within a separate container. Each container is logically separated from one another, and applications may operate within a container as though other application containers 220 were not being managed by the container runtime environment 210. That is, the existence of the container may be invisible to the application container 220, which may view the operating system 200 as though it were directly interacting with the operating system 200. Each application container 220 may execute any application of interest to a subscriber of the computing host 110. Such applications may be various server, database, backend, frontend, and other such systems desired by a subscriber. For example, for an online shopping subscriber, the various applications may provide an application that receives and services user requests for webpages, another application that accesses products responsive to a user request, another application that selects advertising for webpages, and so forth.

The control plane agent 230 coordinates with the container runtime environment 210 to provide control for various services of the service control system 100, and links the computing host 110 with the service control system 100, and is one means for performing this function. In one embodiment, the control plane agent 230 is itself a container of the container runtime environment 210, while in another embodiment the control plane agent 230 may be a logical component of the container runtime environment 210. The control plane agent 230 receives notification from the container runtime environment 210 when a new application container 220 is instantiated and notifies the service control system 100 to add the new application container 220 to the containers managed by the service control module. Using the control plane agent 230 at the computing host 110, which may be instantiated as a container, the control plane agent 230 provides common control for many different computing hosts 110 across different providers without relying on control services that may be provided by the cloud provider 120.

The control plane agent 230 receives control commands from service control system 100 and issues commands to control the application container 220. The control plane agent 230 may receive requests for services from service control system 100. As examples of these services, the service control system may request a network to be setup between the application container 220 and another application container. As another example, the service control system 100 may provide a request to backup a storage volume of a given application container managed by the control plane agent 230. In this example, a single control plane agent 230 controls a plurality of application containers 220.

To provide these services and control of the application containers, the control plane agent 230 registers with the container runtime environment 210 to receive various events from the application containers 220, which monitors networking events issued by application containers 220 in the computing host 110, and accesses parameters and information within an application container 220, for example to access a storage volume of a container. The container runtime environment 210 is one means for performing these functions. The control plane agent 230 may also monitor performance of the application containers, the quantity of application containers instantiated by the container runtime environment 210, and otherwise monitor the environment of the application containers 220. The control plane agent 230 also issues requests to the container runtime environment 210 to instantiate or destroy application containers, for example to create a new container for a specific application, or to stop a container that has an application that stalled or is malfunctioning.

The various services provided by control plane agent 230 are further described below in conjunction with the corresponding actions performed by the service control system 100.

Returning to FIG. 1, the service control system 100 manages these services in conjunction with the control plane agent 230. The networking controller 104 maintains a table including each of the computing hosts 110 and the various containers operating within the computing hosts. The networking controller 104 establishes a common control plane for the containers by adding and removing containers from an overlay network and establishing networking connections between containers, and is one means for performing this function. The networking controller 104 identifies the networking address of the computing host 110, and an overlay networking address for each container 130. When a new container is created, at a host, the networking controller 104 adds the new container to the overlay network, which may permit each container to communicate using the overlay network address.

Figure 3:
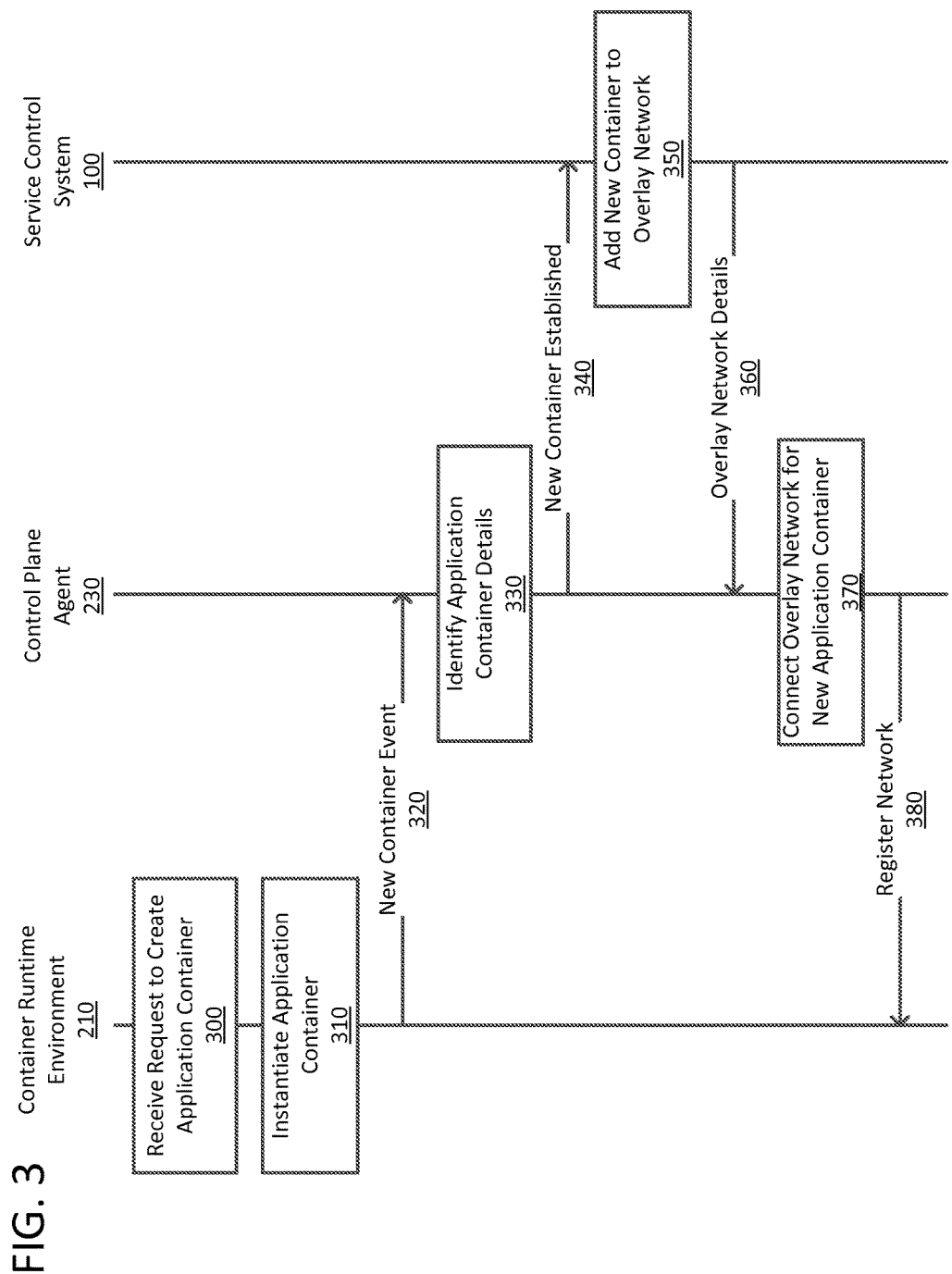
FIG. 3 is an example an interaction diagram for adding a container to an overlay network according to one embodiment.

FIG. 3 is an example an interaction diagram for an algorithm for adding a container to an overlay network according to one embodiment of the container runtime environment 210. Initially, the container runtime environment 210 receives 300 a request to create a new application container. The request may specify a specific application for execution in the new container. The container runtime environment 210 may receive this request from a user, from an application container, or from the control plane agent 230. The container runtime environment 210 instantiates 310 the new application container. When the new application container is created, the container runtime environment 210 generates an event 320 or otherwise signals the control plane agent 230 that a new container is created.

The control plane agent 230 receives the event and identifies 330 the new application container to determine whether the application container is to be managed by the control plane agent 230 and what application is executed within the container. To add a new managed container to the overlay network and management by the service control system 100, the control plane agent 230 communicates with the service control system 100 and reports 340 that the new application container was established, and describes the details of the container, such as the particular application executing in the application. The service control system 100 assigns the new container to an overlay network address and adds the new container to the table designating the container as belonging to the overlay network. In addition, the service control system 100 may propagate details of the new container to other containers and computing hosts, so that the container can be added to the set of devices associated with the overlay network. In some embodiments, the application of the new container is identified to provide an identification of the new application available to process requests from other containers.

The service control system 100 provides details of the overlay network address to the control plane agent 230. The control plane agent 230 associates the overlay network address with the new container in its networking table and connects 370 the container to the overlay network. Next, depending on the configuration of the control plane agent 230 and container runtime environment 210, the control plane agent 230 may notify the container runtime environment 210 or the newly-created container of the overlay networking address. In other embodiments, the control plane agent 230 maintains an identification of the overlay networking address and uses the address when another system requests a communication with the new container. At that point, the control plane agent 230 may setup a connection between the requesting container and the newly-created container, for example by establishing a tunnel between the two containers.

Figure 4:
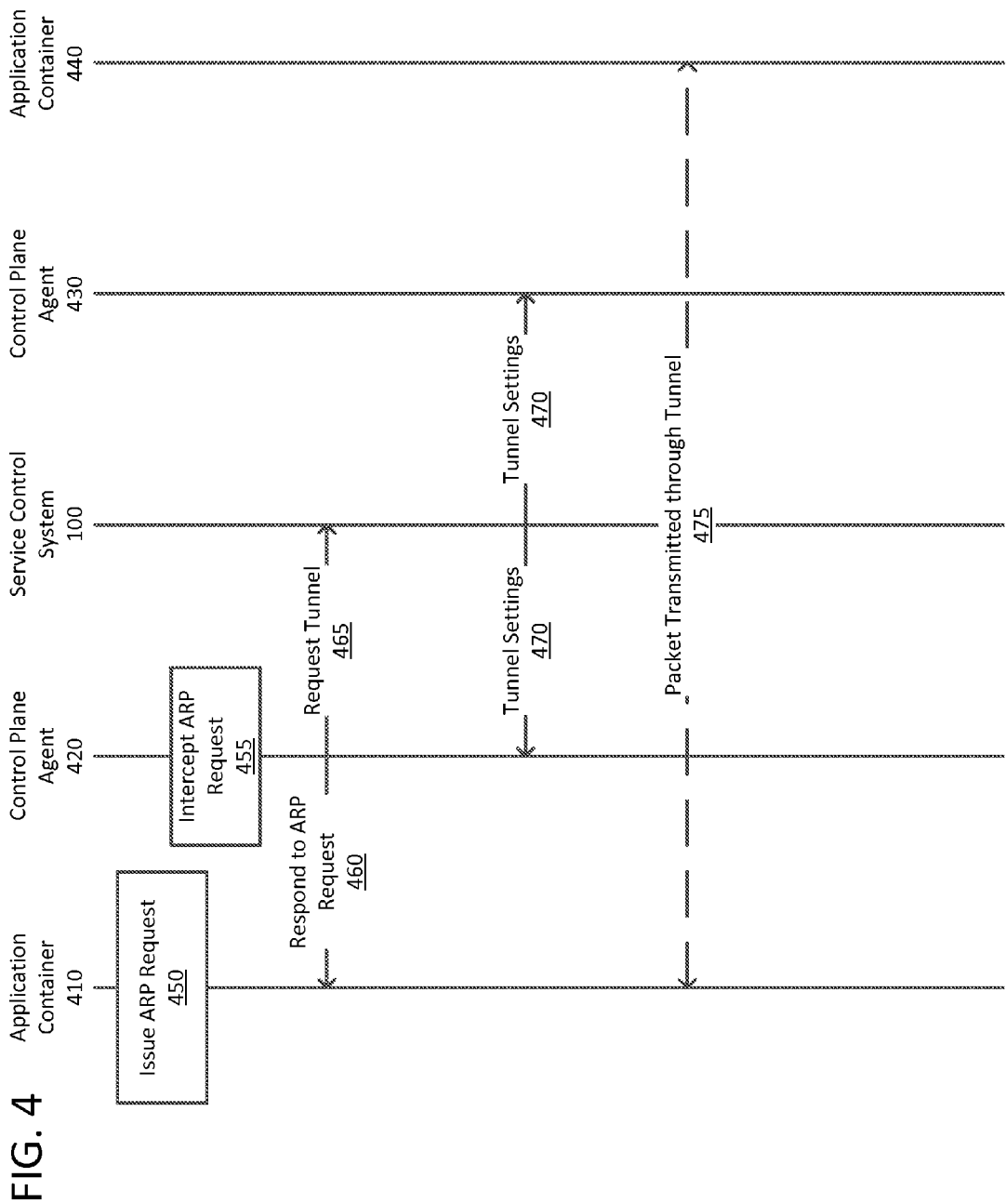
FIG. 4 shows an interaction diagram for initializing a tunnel between two containers managed by a service control system.

FIG. 4 shows an interaction diagram for an algorithm for initializing a tunnel between two containers managed by the service control system 100, in one embodiment of the control plane agent. In this example, to communicate between two containers, the communications between the containers are encrypted within a container-container tunnel. In this way, the containers may transmit sensitive information that cannot be viewed by other containers or by other systems. At each computing host, the control plane agent configures settings for a network tunnel between the containers, which may be also be used to encrypt network traffic. One example of such encryption is IPsec. In this method, each packet is encrypted when sent and may be decrypted at the receiving side. When a container sends a message to another container, each container establishes a secure tunnel connection in this way, and permits direct container-container connections with security.

For convenience with reference to FIG. 4, an application container 410 seeks to send messages to application container 440, each of which operates on a separate computing host that has a control plane agent 420 and a control plane agent 430, respectively. When the application container 410 wishes to send a message, it may have an overlay networking address for application container 440, but does not have a link layer address. Thus to send a message, the application container 410 issues an address resolution protocol (ARP) request to identify the link layer address for the container. This ARP request may be provided to the operating system 200 via the container runtime environment 210. The control plane agent 420 monitors ARP requests and intercepts the ARP request from the container 410 after identifying that the request is issued from application container 410 and is requesting a link layer address for an overlay networking address of the application container 440.

The control plane agent 420 responds to the ARP request 460, such that the application container 410 does not continue to request address resolution. Meanwhile, the control plane agent 420 notifies the service control system 100 and requests 465 a tunnel between the application container 410 and the application container 440. The service control system 100 establishes and transmits 470 tunnel settings to each control plane agent 420, 430 for the tunnel. The settings may specify, for example, communication modes, encryption protocols, and security keys. The tunnel settings are used by each control plane agent 420, 430 to establish the tunnel between application container 410 and application container 440 via configuration of the container runtime environment 210 for the application containers 410. When a packet is transmitted from the application container 410 to the network interface accessible to the application container 410, the packet is encapsulated using the tunnel prior to transmission to the computing host of the application container 440 and packets may be transmitted via the tunnel 475 between the application containers 410, 440. This provides a secure, on-demand connection between the two containers.

Returning to FIG. 1, the service control system 100 may also provide firewall and user permission control via the firewall controller 106. The firewall controller 106 may provide an interface for setting acceptable network connections by a service operator, or may retrieve settings from stored settings or another source, and is one means for performing this function. To enforce the firewall settings, the firewall controller 106 identifies when containers are attached to the overlay network via the networking controller 104. The firewall settings are then sent to the control plane agent 230 associated with the new controller. At the computing host, the control plane agent 230 may modify the firewall settings of the computing host and the application container, such as by modifying any applicable tables via the container runtime environment 210. Similarly, user groups and other permissions may also be controlled via the firewall controller 106.

The load balancer controller 108 may also manage load balancers for the various containers managed by the service control system 100, and is one means for performing this function. The load balancer controller 108 may manage multiple load balancer containers to direct requests to specific applications. For example, a load balancer for a front-end service will handle requests sent to the containers implementing this front-end service implemented at the various computing hosts 110. The load balancer controller 108 may increase or decrease the number of load balancer containers at a one or more computing hosts 110 that host the load balancer container. The load balancer controller 108 may also receive performance information from the control plane agent 230 indicating the relative performance and load of each application container.

In addition, the load balancer controller 108 may provide a proxy service or DNS-based load balancing for the applications, directing incoming requests to one of the various applications. In one embodiment, the service control system 100 performs domain name service (DNS) resolution load balancing. The service associated with the application may be associated with a specific domain name. Requests to resolve the domain name to a networking address (i.e., DNS resolution) may be received by the service control system 100. In one embodiment, local load balancing is performed at the computing host 110 to distribute requests to containers at the computing host 110.

Returning to FIG. 1, the storage controller 102 may provide backup and restoration for storage volumes of individual application containers. The storage controller 102 maintains access to a secondary storage, such as another cloud-based storage solution. This secondary storage may be remote from the storage volume of the container being managed by the storage controller 102 and provides a secure location for storing and maintaining backups data in the volumes. The secondary storage may also be restored to another container to provide the data that was backed up to the same application executing in another container or computing host 110.

Figure 5:
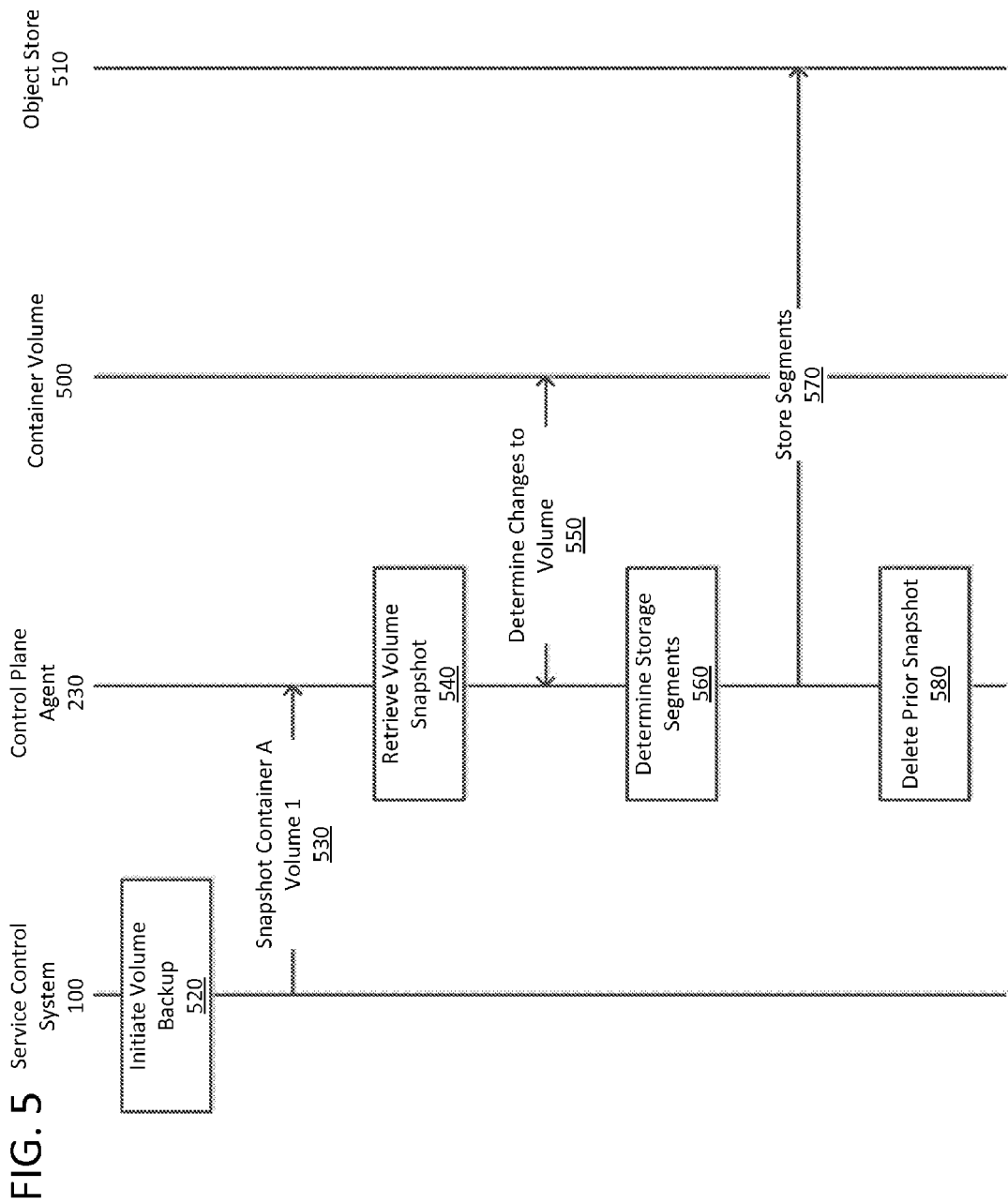
FIG. 5 shows an interaction diagram for a backup of a container volume to an object store according to one embodiment.

FIG. 5 shows an interaction diagram for an algorithm for a backup of a container volume to an object store according to one embodiment, performed by the control plane agent 230. In this example, the object store 510 represents the secondary storage that stores a backup of the container volume 500. In this example, the service control system 100 initiates 520 the volume backup of a container managed by a control plane agent 230 on a computing device 110. In other embodiments a backup of the volume may be automatically initiated by the control plane agent 230 at an interval, such as each day or week. In this example, the request to backup a volume is sent 530 by the service control system 100 (such as by the storage controller 102 shown in FIG. 1).

To backup a volume, a volume may be separated into a plurality of segments representing portions of the volume. The segments may be a fixed or variable size. In one embodiment, the segments are 2 megabytes (Mb) in size. The segments may be determined for each backup, and the changes to the storage volume may be represented in the segments, such that each backup incrementally stores additional segments, and may not re-send segments that were part of a previous backup. In this way, each segment may store a portion of the container volume 500, and differences in the container volume 500 are identified and sent to the object store 510 via the new segments.

To identify these segments, the control plane agent 230 retrieves 540 the volume snapshot of the container 500. The retrieved volume snapshot 540 may itself maintain a separate set of the segments, or may identify the contents of each segment, for example by identifying a path and one or more files in the volume that are associated with the segment. Next, the control plane agent 230 accesses the container volume 500 to determine 550 changes to the container volume relative to the volume snapshot. The control plane agent determines one or more storage segments 560 that reflect the changes to the container volume 500. In addition, the control plane agent 230 may determine one or more segments that are no longer part of the container volume 500. The new storage segments are stored 570 at the object store 510, and segments that are no longer a part of the new volume snapshot may be queued for deletion or garbage collection at the object store 510. In one embodiment, the segments may be encrypted or otherwise stored as a binary file that permits the segments to be stored at the object store 510 without enabling access by another entity to the stored segments. After storing the segments to the object store 510, the control plane agent 230 may delete 580 the prior snapshot stored at the control plane agent.

For another container to reconstitute the container volume 500, the service control system 100 identifies the snapshot stored at the object store 510. The segments at the object store 510 associated with that snapshot are retrieved by the container volume 500 to reconstitute the container volume, and the snapshots at the container are expanded to recreate the container volume 500.

Figure 6:
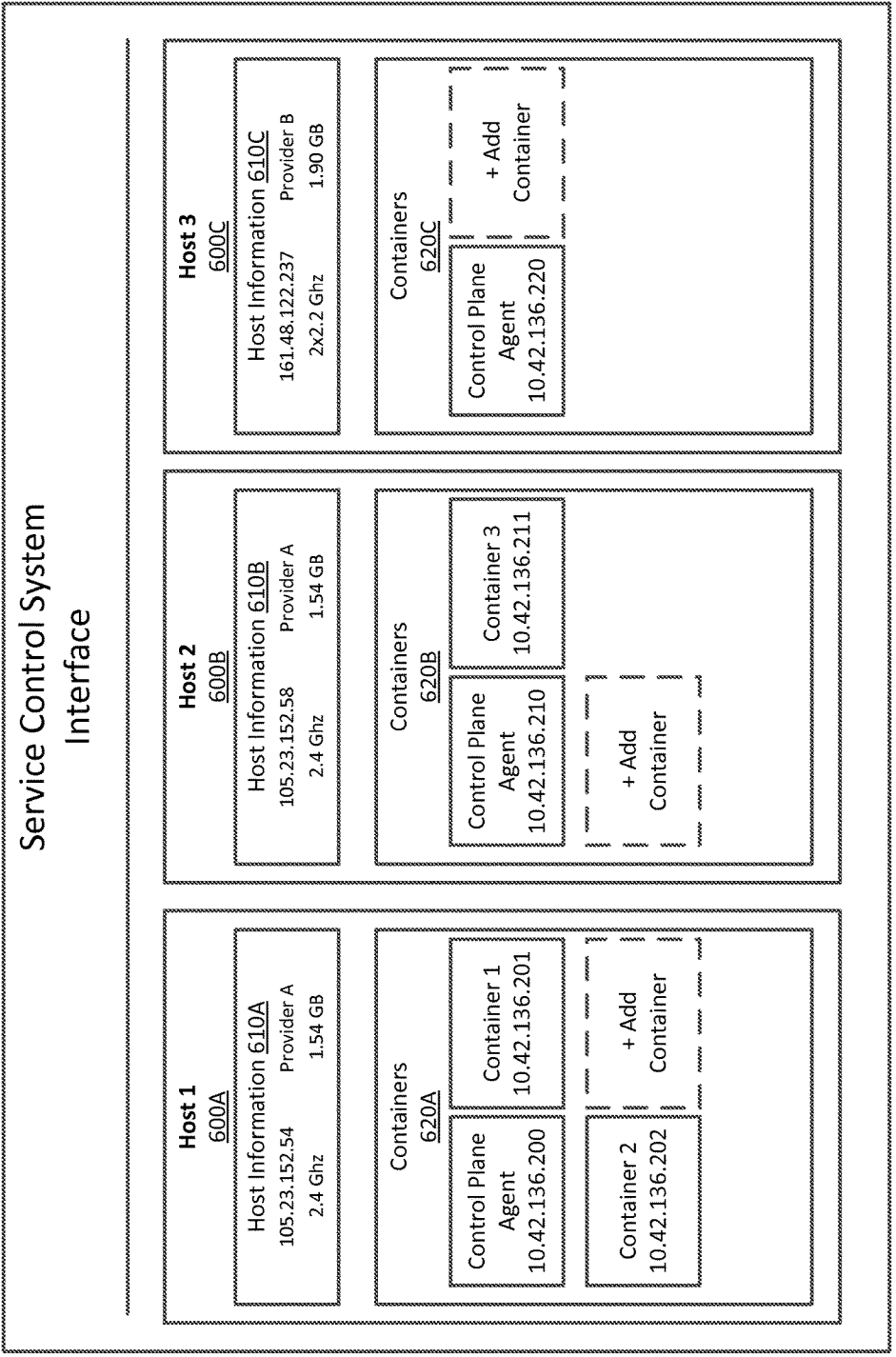
FIG. 6 shows an example user interface for a user to view computing hosts and containers managed by a service control system.

FIG. 6 shows an example user interface for a user of a computer system to view computing hosts and containers managed by a service control system. This interface may be generated by the service control system 100. In this example, three computing hosts are managed by the service control system 100. This user interface permits a user to logically view containers present on several computing hosts, and may also provide interface elements for interacting with the computing hosts and services managed by the service control system 100. In this example, each host 600 is displayed with a set of host information 610 and a set of containers 620 executing on each host.

In this example, the host information may display the networking address of the computing host. In this example, the first computing host has a networking address of 105.23.152.54, as shown in host information 610A. The information 610 may also display the processing, memory, and storage capacities of each computing host. In addition, the information may specify which provider 120 has provided the computing host. In this example, host 1 and host 2 are provided by Provider A, while host 3 is provided by provider B. This may permit a user to quickly determine which computing hosts are provided by which providers, and the capacities of each computing host.

The application containers running on each computing host are displayed in interface element 620. As shown in this example, each computing host may include a container for the control plane agent as well as additional containers executing various applications. Each container may also be displayed with an overlay networking address associated with the container. In this example, Host 1 includes three containers, including three overlay networking addresses. As described above, when a container seeks to send a message to another container, it may address the communication to the overlay networking address of the destination container. In this example, host 3 has a single container for the control plane agent. An operator may request the creation of additional containers on a computing host from the service control system interface, such as on the container element 620. When a user requests a new container, the user may specify a particular application to execute within the container. The service control system 100 sends a message to the control plane agent at the designated computing host 110 to request creation of a new container from the container runtime environment 210 and to add that new container to the containers managed by the service control system 100. Using the service control system interface, a user may easily view and manage the various containers managed by the service control system 100. Additional interfaces may also be provided to the user, for example to request a backup or restore of a container volume, to manage firewall or group permission settings, and to otherwise manage the various containers located at the various computing hosts and providers.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for controlling containers at a plurality of computing hosts, comprising:
   receiving a request from a first control plane agent of a first container runtime environment at a first computing host to establish a control plane for the first computing host, the first computing host maintained at a first cloud computing provider and executing a first application container in the first container runtime environment, wherein the first control plane agent is a container in the first container runtime environment that coordinates services of the control plane with other containers in the first container runtime environment;
   receiving a request from a second control plane agent of a second container runtime environment at a second computing host to establish a control plane for the second computing host, the second computing host maintained at a second cloud computing provider and also executing a second application container in the second container runtime environment, wherein the second control plane agent is a container in the second container runtime environment that coordinates services of the control plane with other containers in the second container runtime environment; and
   adding the first and second computing hosts to a control plane.

2. The method of claim 1, further comprising providing a service to the first and second computing hosts via the control plane.

3. The method of claim 1, wherein the control plane comprises an overlay network for the first computing host and the second computing host.

4. The method of claim 3, wherein the first application container is associated with a first overlay network address in the overlay network and second application container is associated with a second overlay network address.

5. The method of claim 1, wherein the service is selected from among a group consisting of networking, load balancing, storage, firewall, and any combination thereof.

6. The method of claim 5, wherein the service provided to the first and second computing hosts is not provided by the first or second cloud provider.

7. The method of claim 5, wherein providing the service via the control plane comprises sending a request to the first control plane agent on the first computing host without requesting a service from the first cloud provider.

8. The method of claim 1, wherein providing the service to the first and second computing hosts comprises controlling the first and second computing host directly via the first and second control plane agent.

9. A method for controlling a set of containers executing on a plurality of computing hosts comprising:
   establishing a control plane for a plurality of computing hosts in communication with a service control system, the control plane providing instructions for a control plane agent executing on each computing host, the control plane agent being one of the containers of the respective computing host and coordinating the control plane with other containers in the respective computing host;
   receiving, at the service control system, a request for a service from a user or the control plane agent executing on a computing host of the plurality of computing hosts, the request specifying a container also executing on the first computing host; and
   providing the service to the control plane agent such that the service is provided to the container specified in the request via communication with the control plane agent.

10. The method of claim 9, wherein the plurality of computing hosts include one or more computing hosts associated with a first cloud computing provider and one or more computing hosts associated with a second cloud computing provider, wherein each of the first and second cloud computing providers maintain separate networks of computing hosts.

11. The method of claim 9, wherein the plurality of computing hosts include a virtual machine.

12. The method of claim 9, wherein the control plane establishes an overlay network.

13. The method of claim 12, wherein the overlay network provides an overlay network address for each of a set of containers of the plurality of computing hosts.

14. The method of claim 12, wherein the service comprises adding the container to the overlay network.

15. The method of claim 9, further comprising sending a request to a control plane agent of the first computing host to create a container for execution of an application within the created container.

16. The method of claim 9, further comprising sending a request to stop the container on the first computing host.

17. The method of claim 9, further comprising sending a request to the control plane agent at the first computing host to backup a storage volume associated with the container to a secondary storage, wherein the control plane agent is configured to segment the storage volume and store the segments at the secondary storage.

* * * * *